(12) United States Patent
Richter

(10) Patent No.: US 6,630,824 B2
(45) Date of Patent: Oct. 7, 2003

(54) METHOD TO MEASURE SIGNAL DECAY AND A DEVICE THEREFOR

(75) Inventor: Hans J. Richter, Palo Alto, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/879,962

(22) Filed: Jun. 14, 2001

(65) Prior Publication Data
US 2002/0063559 A1 May 30, 2002

Related U.S. Application Data

(60) Provisional application No. 60/239,553, filed on Oct. 10, 2000.

(51) Int. Cl.[7] .................... G01R 33/12; G11B 5/02
(52) U.S. Cl. ............................... 324/212; 360/25
(58) Field of Search ..................... 324/212, 210; 360/135; 369/275.1

(56) References Cited

U.S. PATENT DOCUMENTS

| | | | |
|---|---|---|---|
| 4,513,333 A | | 4/1985 | Young et al. |
| 4,620,244 A | | 10/1986 | Krause |
| 5,233,487 A | | 8/1993 | Christensen et al. |
| 5,256,965 A | | 10/1993 | Nomura |
| 5,424,885 A | | 6/1995 | McKenzie et al. |
| 5,923,485 A | | 7/1999 | Ito |
| 6,078,461 A | | 6/2000 | Smith et al. |
| 6,104,556 A | * | 8/2000 | Schaenzer ............ 360/25 |
| 6,147,488 A | | 11/2000 | Bamba et al. |
| 6,157,189 A | * | 12/2000 | Stark et al. ............ 324/212 |
| 6,166,536 A | * | 12/2000 | Chen et al. ............ 324/212 |
| 6,265,868 B1 | * | 7/2001 | Richter ............ 324/212 |
| 6,483,299 B1 | * | 11/2002 | Pressesky et al. ............ 324/212 |
| 6,483,300 B1 | * | 11/2002 | Severson ............ 324/212 |

OTHER PUBLICATIONS

"Effect of the Increase of Side Erase Band Width on Off–Track Capability of High Frequency Magnetic Recording", 9/96, Huang et al. in IEEE Transactions on Magnetics, vol. 32, No. 5.*
"Spectral Null Codes", 3/90, K. A. Immink in IEEE Transactions on Magnetics, vol. 26, No. 2.*
"Spin–Stand Measurements of Time and temperature Dependence of Magnetic Recordings", 4/99, Dhagat et al. in Journal of applied Physics, vo. 85, No. 8.*
"Spin–Stand Characterization of Thermal Stability in High Density Disk Media", 9/00, Shi et al. in IEEE Transactions on Magnetics, vol. 36, No. 5.*
Dhagat et al., "Spin–Stand Measurements of Time and Temperature Dependence of Magnetic Recordings," Journal of Applied Science, vol. 85, No. 8. pp 4994–4996, (Apr. 15, 1999).
Dhagat et al., "Submillisecond Spin–Stand Measurements of Thermal Decay in Magnetic Recordings," IEEE Transactions on Magnetics, vo. 36, No. 2. pp 528–531, (Mar. 2000).
Hosoe Y et al., "Thermal Aftereffects in Thin Film Magnetic Recording Media," IEEE Transactions on Magnetics, vol. 34, No. 4., Part 1, pp 1528–1533 (Jul. 1998).
Weller D et al., "Thermal Effect Limits in Ultrahigh–density Magnetic Recording," IEEE Transactions on Magnetics, vol. 35, No. 6. pp 4423–4439, (Nov. 1999).
Zhang Y et al., "Thermal Decay in High Density Disk Media," IEEE Transactions on Magnetics, vol. 34, No. 5. pp 3786–3793, (Sep. 1998).

(List continued on next page.)

*Primary Examiner*—John Barlow
*Assistant Examiner*—Toan M Le
(74) *Attorney, Agent, or Firm*—Morrison & Foerster LLP

(57) ABSTRACT

An apparatus and a method for measuring signal decay of a magnetic recording medium using an approach in which a control track and a track of interest are located on one track are disclosed.

19 Claims, 6 Drawing Sheets

OTHER PUBLICATIONS

R. Street and J.C. Woolley, "A study on magnetic viscosity," Proc. Roy. Soc., A62, pp 562, 1949.

C.P. Bean and J. D. Livingston, "Superparamagnetism," *J. Appl. Phys.*, vol. 30 Suppl., pp 120S–129S, Apr. 1959.

E. F. Kneller and F.E. Luborsky, "Particle size dependence of coercivity and remanence of single domain particles," *J. Appl. Phys.* vol. 34, pp 656–658, Mar. 1963.

Y. Zhang and H.N. Bertram, "Thermal decay in high density disk media," *IEEE Trans Magn*, vol. 34, pp 3786–3793, Sep. 1998.

P. Dhagat, R.S. Indeck, M. W. Muller, "Spin–stand measurements of time and temperature dependence of magnetic recordings," *J. Appl. Phys*, vol. 85, pp 4994–4996, Apr. 1999.

H.J. Richter, "Longitudinal recording at 10 to 20 Gbit/inch$^2$ and beyond," *IEEE Trans. Magn.* vol. 35, pp. 2790–2795, Sep. 1999.

"Measurement of the Linear Density Dependence of Thermal Decay of Square–Wave Recordings," presented at the 8$^{th}$ Joint MMM–Intermag Conference, San Antonio on Jan. 11, 2001.

* cited by examiner

Figure 4
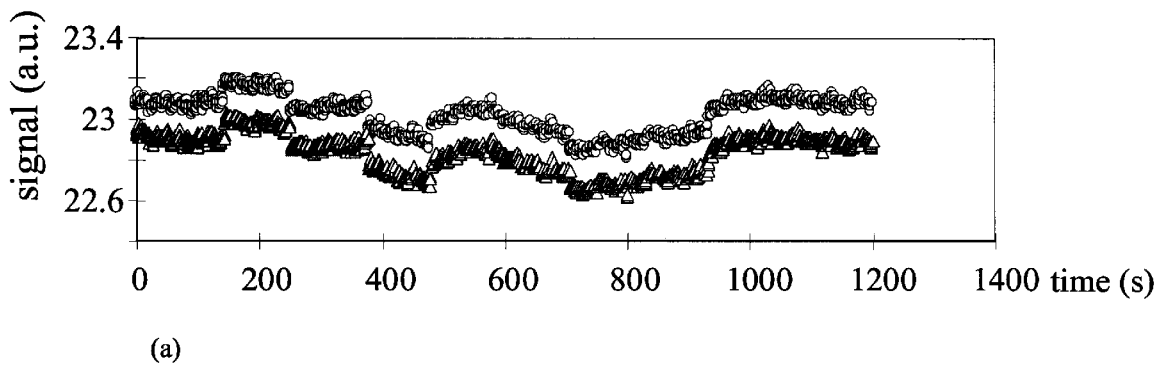
(a)
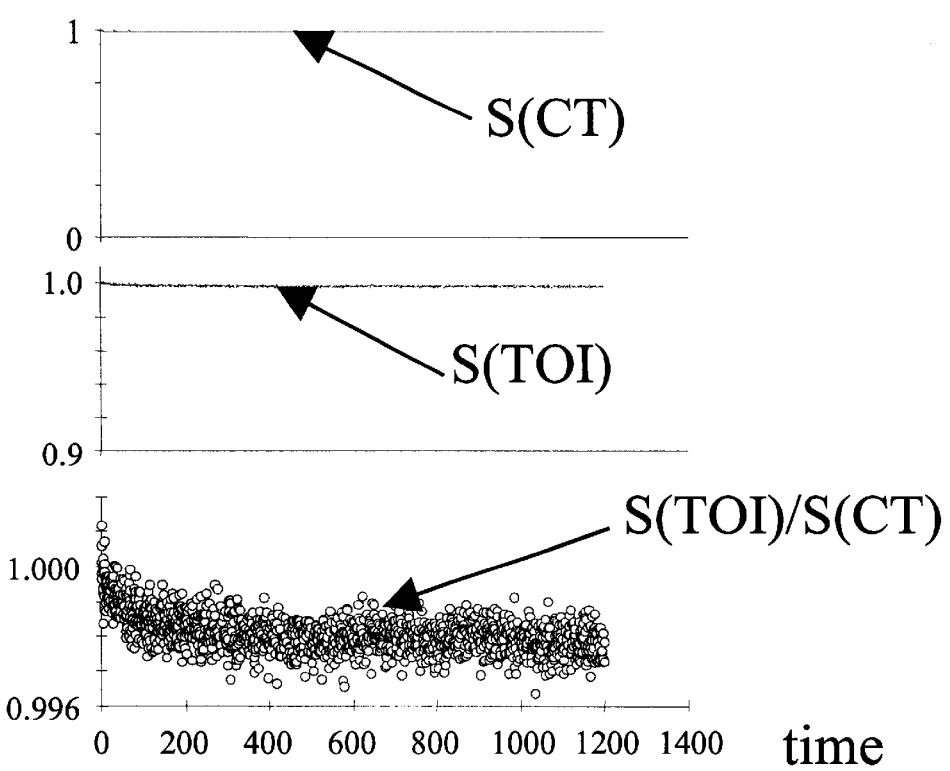
RT, 350 kfci
(b)

METHOD TO MEASURE SIGNAL DECAY AND A DEVICE THEREFOR

RELATED APPLICATIONS AND PUBLICATIONS

This application claims priority from U.S. Provisional Application Ser. No. 60/239,553, filed Oct. 10, 2000, entitled "Method to Measure Signal Decay," the entire disclosure of which is hereby incorporated herein by reference and a PCT international application filed concurrently entitled "Method to Measure Signal Decay and a Device Therefor. This application is related to the publication entitled "Measurement of the Linear Density Dependence of Thermal Decay of Square-Wave Recordings," presented on Jan. 11, 2001, at the $8^{th}$ Joint MMM-Intermag Conference, San Antonio, U.S. Ser. No. 09/708,491, entitled "Apparatus And Method For Measuring Magnetic Properties Of Recording Mediums," filed Nov. 9, 2000, and U.S. Pat. No. 6,166,536, issued Dec. 26, 2000, which are hereby incorporated herein by reference.

FIELD OF THE INVENTION

The present invention relates to an apparatus and method for measuring signal decay of magnetic recordings.

BACKGROUND

While the areal density in magnetic hard disk recording has increased, it is understood that thermal activation processes may impose a limit on the ultimate recording density that can be achieved. Thin film media have a granular structure with grains well below the single domain size. There is a general agreement that maintaining adequate signal-to-noise ratio, SNR, at higher recording density requires a reduction of grain size. Very small grains become superparamagnetic. See C. P. Bean and J. D. Livingston, "Superparamagnetism," *J. Appl. Phys*, vol. 30 Suppl., pp 120S-129S, April 1959. That is, they remain (internally) magnetically ordered, but lose hysteresis. When the superparamagnetic regime is approached, hysteresis vanishes gradually and one observes a decrease in coercivity with grain size, as reported by Kneller and Luborsky. See E. F. Kneller and F. E. Luborsky, "Particle size dependence of coercivity and remanence of single domain particles," *J. Appl. Phys*. vol. 34, pp 656-658, March 1963. For magnetic recording applications, the onset of superparamagnetism manifests itself in two ways: (1) the coercivity becomes time dependent and (2) the recorded information becomes unstable over time. See H. J. Richter, "Longitudinal recording at 10 to 20 Gbit/inch$^2$ and beyond," *IEEE Trans. Magn.* vol. 35, pp. 2790-2795, September 1999. Thus, the proper choice of grain size for high density recording media reflects a trade-off between the stability of the recorded information and achievable SNR.

Since a recording must not decay significantly over the lifetime of a recording device, a realistic assessment of the stability requires an extremely precise measurement of signal decay. If the signal decays at a rate of 1% per order of magnitude (decade) in time, for example, a signal change of only a fraction of 1% has to be detected during a measurement ranging from 0.1 to 10,000 seconds. In this invention, "long term" means a decade or more while "short term" means 10,000 seconds or less. The theory of thermal activation predicts that elevated temperature accelerates signal decay. Magnetic fields, such as demagnetizing fields, also accelerate signal decay.

For practical use, the information stored magnetically typically has a lifetime of several years. The magnetization or signal decay varies in most cases logarithmically with time. See R. Street and J. C Woolley, "A study on magnetic viscosity," Proc. Roy. Soc., A62, pp 562, 1949. In order to assess a priori what the signal decay of recorded information would be after several years, one has to measure the signal loss at a reasonable time period after recording and extrapolate thereafter. Media that could exhibit a significant amount of signal decay after several years of recording are obviously not practically useful. On the other hand, "good" media that would exhibit little signal decay after several years of recording would likely exhibit almost negligible signal decay at a reasonably short period after recording. Therefore, prior to this invention, the challenge facing a person trying to develop a "good" recording medium was to reliably measure short-term signal decay to accurately predict the long-term performance of the medium. Prior to this invention it was not possible to reliably measure extremely small changes of the recorded signals because of the following two experimental problems:

(1) Thermal drift: Over time, the head moves across the written track due to temperature changes of the environment.

(2) Sensitivity changes of the transducer, i.e. the recording head: Typical sensitivity changes are of the order of a few percent. These sensitivity changes add to noise of the measurements and, therefore, one is no longer able to detect small changes in the signal.

To eliminate the thermal drift effects, one has to reposition the head using a scan of a reference track, which is also called control track (CT). To account for the transducer sensitivity change, the prior art teaches the CT should be aged. See P. Dhagat, R. S. Indeck, M. W. Muller, "Spin-stand measurements of time and temperature dependence of magnetic recordings," *J. Appl. Phys*, vol. 85, pp 4994-4996, April 1999 and Y. Zhang and H. N. Bertram, "Thermal decay in high density disk media," *IEEE Trans Magn*, vol. 34, pp 3786-3793, Sep. 1998. The aging process assures that the signal change of the aged reference track can be neglected and one has a stable reference signal.

However, the prior art teaches that the CT and the decaying track, also called the track of interest (TOI), should be separate tracks. Therefore, by the prior art methods, any correction of the signal of the CT requires swapping tracks and performing a track scan of the CT while a track scan of the TOI has been stopped. During this time period, typically, of a few seconds, when the track scan of the TOI has been stopped, the head sensitivity could change. Although the referencing technique improves the quality of the data, the data still remain corrupted by noise and small magnetization changes remain undetected.

The present invention describes a method for measuring very small changes in recorded signals on a spin-stand tester and an apparatus therefore. Particularly, this invention focuses on correcting sensitivity changes of the transducer. The present invention deals with a technique that allows the measurement of signal changes much more sensitively than that possible by the prior art methods. In addition, data could be acquired one order of magnitude faster than that done using the prior art methods.

SUMMARY OF THE INVENTION

This invention is directed to an apparatus and a method for measuring the decay of the magnetic properties of recording media. Particularly, the invention is directed to an apparatus and a method for measuring the short-term signal decay of disk recording media.

One embodiment is a system for measuring signal decay, comprising means for positioning a recording head and a recording track comprising a control track and a track of interest located on a track of the recording track. The means for positioning a recording head could comprise a head positioner such as that disclosed in U.S. Pat. No. 6,166,536.

Another embodiment is a method for measuring signal decay, comprising reading an information signal from a control track and reading an information signal from a track of interest, wherein the control track and the track of interest are located on a track of a recording track. The method could further comprise writing data onto the control track. The method could further comprise recording left and right pilot tones on each side of the control track. The method could further comprise locating a position where the left pilot tone reduces to 30% of a maximum value of the left pilot tone and locating a position where the right pilot tone increases to 30% of a maximum value of the right pilot tone. The method could further comprise aging the control track after writing data to the control track. The method could further comprise monitoring the left and right pilot tones while aging the control track. The method could further comprise aligning a recording head with respect to the control track. The method could further comprise writing data onto the track of interest. The method could further comprise calculating a normalized signal S(TOI)/S(CT). In a preferred embodiment of the method of this invention, the reading of an information signal from a control track and the reading of an information signal from a track of interest are done without swapping a recording head between two different recording tracks. The method could further comprise finding a track center using a track scan comprising a positioning section.

Another embodiment is a system for measuring signal decay, comprising a control track and a track of interest located on a track of a recording track. The system could further comprise a read gate and a write gate. The system could further comprise means for generating pilot tones. The system could further comprise a device for computing a normalized signal S(TOI)/S(CT). The system could further comprise a recording head for reading an information signal from the recording track. The system could further comprise a spectrum analyzer for analyzing the information signal. The system could further comprise a read-write head comprising a writer and a reader, wherein a width of the writer is greater than a width of the reader.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings, wherein:

FIG. 4a shows traces of signals recorded from a control track and a track of interest.

FIG. 4b shows normalized traces of the signals shown in FIG. 4a.

DETAILED DESCRIPTION OF THE INVENTION

Figure 1:
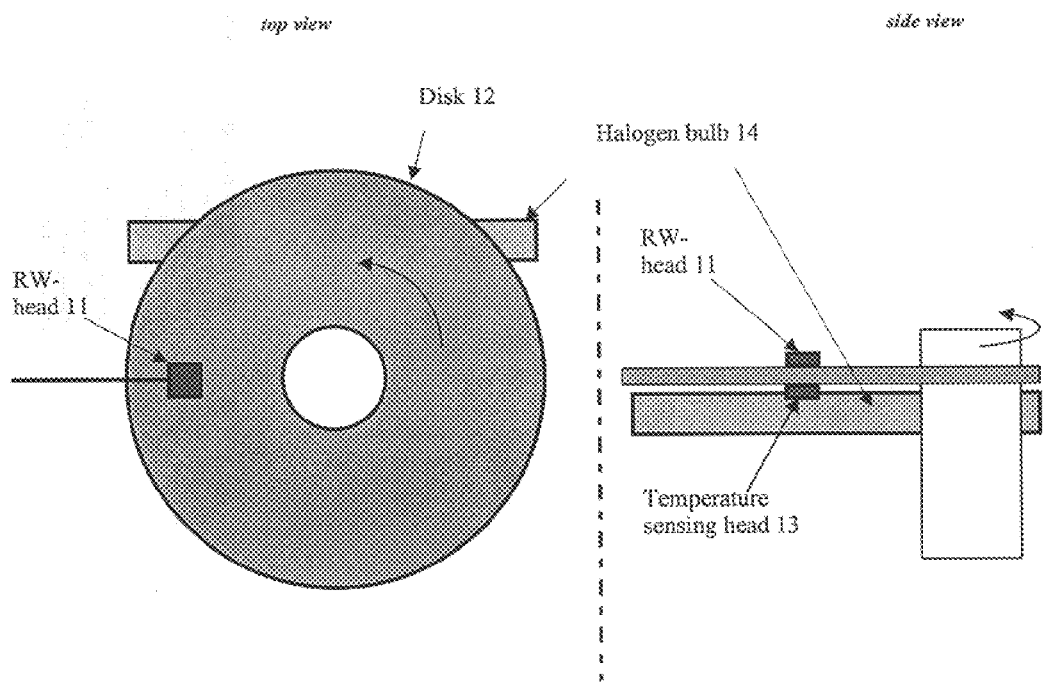
FIG. 1 shows the top and side views of a disk used in measuring signal decay in a method of this invention.

In one embodiment, the decay data is taken at room temperature with a read-write (RW) head 11 on the top surface of the disk 12 as shown in the top view of FIG. 1. A second read-write head 13, flown on the bottom side of the disk 12, is used to sense the disk temperature as shown in the side view of FIG. 1. Optionally, the disk 12 could be heated using halogen bulb 14 that is mounted in close proximity of the disk 12 as shown in the top and side views of FIG. 1.

Since the resistance of the write coil of head 13 depends linearly on the temperature, it provides a convenient means to measure the disk temperature in-situ. The temperature measurement therefore reduces to a simple four-wire resistance measurement that can easily be calibrated to a commercial thermometer. It is estimated that the disk temperature is within 1° C. of the targeted value, e.g., the room temperature. It was also checked that the temperature of the top surface of the disk is close to that of the bottom surface. The resistance measurement is fed into a commercial temperature controller, which keeps the temperature constant within ±0.1° C. during the measurement. With this arrangement, decay measurements at disk temperatures as high as 95° C. have been made.

In order to take high quality data, the inevitable variations of the head sensitivity of the head 11 have to be compensated. An aged recording can be used as a reference as explained above. In this invention, however, a unique approach is used, namely, that the CT and the TOI are recorded onto one track. In the context of this invention, the phrase "recorded onto" is analogous to "located on." By this approach, using a spectrum analyzer in zero span mode, the data of the CT and the TOI sections can be read quickly enough that head sensitivity variations no longer deteriorate measurement quality.

Figure 2:
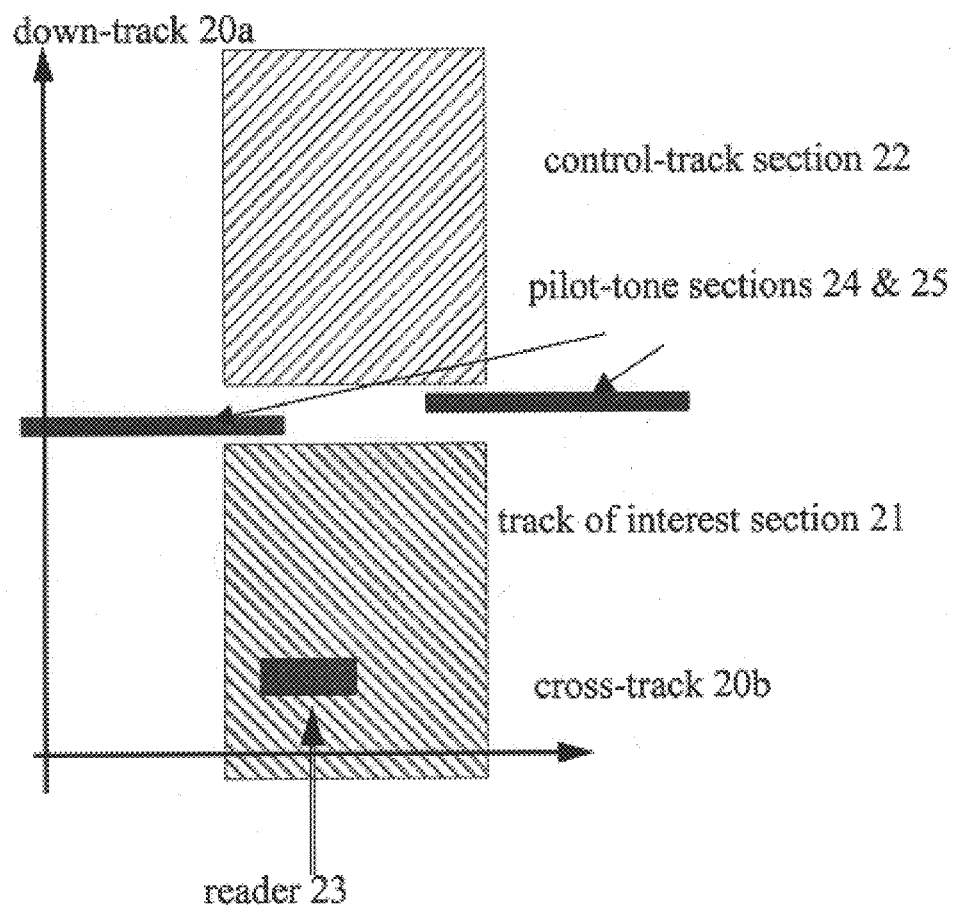
FIG. 2 shows a section of a single track containing sections of a control track, a track of interest and pilot tones.

In one embodiment, very wide writers (~8 $\mu$m) with a very narrow reader (2 $\mu$m) have been used. Therefore, both the CT and the TOI are no longer physically separated tracks. Instead, they are sections of one entire track as shown in FIG. 2. This feature has several advantages. The data are acquired virtually simultaneously. Head sensitivity changes are thus caught as best as they can because there is no swapping of the head between TOI section 21 and CT section 22 of FIG. 2. Note that the TOI section 21 and CT section 22 are located on the same down-track along the down track direction 20a, not on separate down-tracks. The clumsy track swapping procedure is no longer necessary. Therefore, a read-write head (not shown in FIG. 2) could read the TOI and CT sections either simultaneously or with negligible time difference while alternatively reading the TOI and CT sections. Track swapping introduces mechanical inaccuracies and is time consuming.

FIG. 2 shows reader 23 with a width smaller than that of a writer for writing the written tracks, i.e., the CT and TOI tracks 21 and 22 shown in FIG. 2. The written tracks, which were written using a wide writer (not shown in FIG. 2), have a certain track width, the written track width. In one embodiment, the width of the reader is narrower than the width of a written track. Also shown in FIG. 2 are left and right pilot tone sections 24 and 25. The purpose of the pilot tones 24 and 25 is explained below in the context of the experimental method of this invention.

In one embodiment, the experimental procedure is as follows:

(1) Record the CT opening a write gate and make a track scan. The read gate is switched such that only the CT is observed (TAA measurement). TAA is a track average amplitude, (as opposed to a spectrum analyzer which measures an unfiltered signal). Note that if the write gate is fully open, one records a track from the beginning to the end (0 to 360°) starting from an index point. For instance one can record from 0.25 to 0.75, then one would record from 90 to 270°. As the names denote, the write gate is for writing and the read gate is for reading.

(2) Record the pilot tones (P1 and P2) on each side. The user can select the positions of the pilot tracks.

(3) Perform track scan again whereby 4 signals (CT, TOI, P1 and P2) are recorded. This is done using a TAA measurement with the read gates selected accordingly.

(4) Store the locations at which the left pilot tone reduces to less than 30% of its maximum value and the location at which the right pilot tone increases to more than 30% of the maximum value.

(5) Move the reader to the track center and the CT is aged. Since there is drift during the aging period, the pilot tones are continuously monitored. Whenever the reader picks up a pilot signal greater than a threshold of 30% of the maximum pilot tone signal, the head is re-positioned.

(6) After the aging period, scan the track scan again. The current locations at which the 30% points of the pilot signals are found. The difference between these positions and the original ones serve to re-center the head for the following write process of the TOI. It is absolutely essential that the CT and the TOI are aligned as well as possible. In particular, the head is moved back further than the newly determined track center and moved to the right again to take out the effect of mechanical hysteresis. After this, the head is kept for 3 seconds at its new position to make sure that eventual mechanical vibrations have settled. Then, the TOI is written.

(7) Record data immediately after writing the TOI. The analyzer is set to zero span and the entire traces are transmitted to the computer. In this way, one is able to record the first datum at about 160 ms after write. The trace is taken apart on the computer and the CT signal and the TOI signal is calculated. The normalized signal (S(TOI)/S(CT)) is calculated for each trace as follows.

First, refer to FIG. 2, showing sections of CT and TOI as a function of time. The way the data acquisition works is as follows. The spectrum analyzer starts to measure at an "index." Such an index signal is available on every spinstand. It is like a marker on the spindle, analogous to a valve on a car wheel. The spectrum analyzer measures the signal in "receiver mode," that is zero span. This means that it records the signal as a function of time. Since the CT and TOI are on the same track, it measures, say, the CT for some amount of time, then it sees the pilot signals (or positioning signal) located between the CT and TOI sections, which is ignored, and then it sees the TOI. So strictly speaking, it measures the CT first and the TOI subsequently, but with a very short time interval in between these two measurements. The spectrum analyzer preferably does not measure signals for a time period longer than the time for one revolution of the disk. In the computer, data points from the analyzer within the periods that measure the CT and TOI, respectively, are averaged like that done by a read gate. After averaging, one obtains two numbers: S(TOI) and S(CT). At the start and end of the data acquisition during each measurement, the computer clock is interrogated. In this way, one assigns a time to S(TOI) and S(CT). Next one takes the ratio S(TOI)/S(CT), which is equal to "s.". One does the above operations every time one measures a datum. In the ideal case, the magnetization that creates S(CT) of the aged control track should be absolutely constant, but due to sensitivity fluctuations, S(CT) is not constant. Since the sensitivity fluctuation is also present while reading S(TOI), the sensitivity fluctuations in S(CT) and S(TOI) cancel out. In accordance with other embodiments of this invention, the order of the segments TOI/POS/CT could be changed.

In one embodiment, the numbers used for the gates and the spectrum analyzer readout are given below in Table 1.

TABLE 1

Gate and spectrum analyzer readout.

|  | write gate | | | read gate | | |
| --- | --- | --- | --- | --- | --- | --- |
|  | fraction | in % | in SA points | fraction | in % | in SA points |
| StartControl | 0.005 | 0.5 | 3 | | | |
| End Control | 0.46 | 46 | 276 | | | |
| Start left Pilot | 0.465 | 46.5 | 279 | 0.47 | 47 | 282 |
| End left pilot | 0.495 | 49.5 | 297 | 0.49 | 49 | 294 |
| Start right Pilot | 0.505 | 50.5 | 303 | 0.51 | 51 | 306 |
| End right Pilot | 0.535 | 53.5 | 321 | 0.53 | 53 | 318 |
| Start TOI | 0.54 | 54 | 324 | | | |
| End TOI | 0.995 | 99.5 | 597 | | | |

The spectrum analyzer has 601 points. In one case, the decay measurement relies on 279 points. Typically, this number is reduced somewhat, because some safeguards need to be left.

Figure 3:
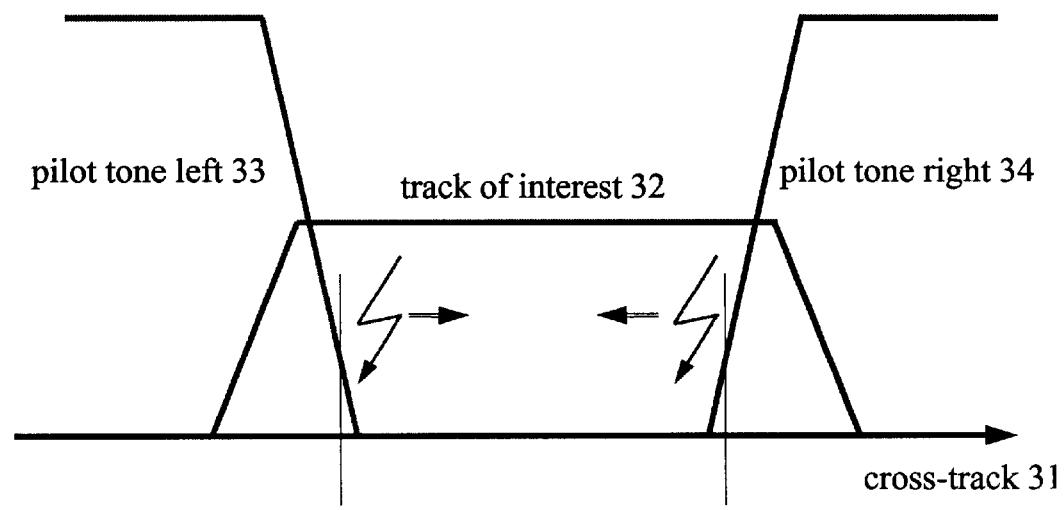
FIG. 3 shows a scheme of a track scan which contains a control-track and pilot tones.

FIG. 3 shows a scheme of a track scan which contains the control-track and the pilot tones. In particular, FIG. 3 shows the patterns of the recording of the TOI and pilot tones. For the measurements reported here, the TOI and CT sections were recorded at 350 kilo flux changes per inch (kfci). The distance between the head and disk center, R, was 1.1 inch and the disk was rotated at 3500 revolutions per minute (RPM). The pilot tones were recorded at 100 kfci each. It is a good experimental practice, to keep the harmonics of the pilot tones away from the TOI and the CT frequencies. The pilot tone should be selected such that it yields a high signal.

This invention will be better understood with reference to the following examples, which are intended to illustrate specific embodiments within the overall scope of the invention as claimed.

EXAMPLE 1

This example applying the experimental procedure outlined above, was carried out to test signal decay at room temperature. The CR and TOI were written and read at room temperature at 350 kfci. The pilot tones were recorded at 100 kfci each. The number of points collected by the spectrum analyzer was 601. The raw traces for the CT and TOI are shown in FIG. 4a.

There were two mechanisms at work which made accurate measurements very difficult. On the one hand, the head was slightly unstable and toggled between two magnetic states. On the other hand, continuous drift of the signal was observed which could be due to a variety of reasons. Both changes affected the read sensitivity by about ±1%. Since the S(CT) and the S(TOI) were measured virtually at the same time, these changes were mutually canceled very effectively, as shown in the plot of the normalized signal ratio S(TOI)/S(CT) in FIG. 4b.

EXAMPLE 2

Figure 5:
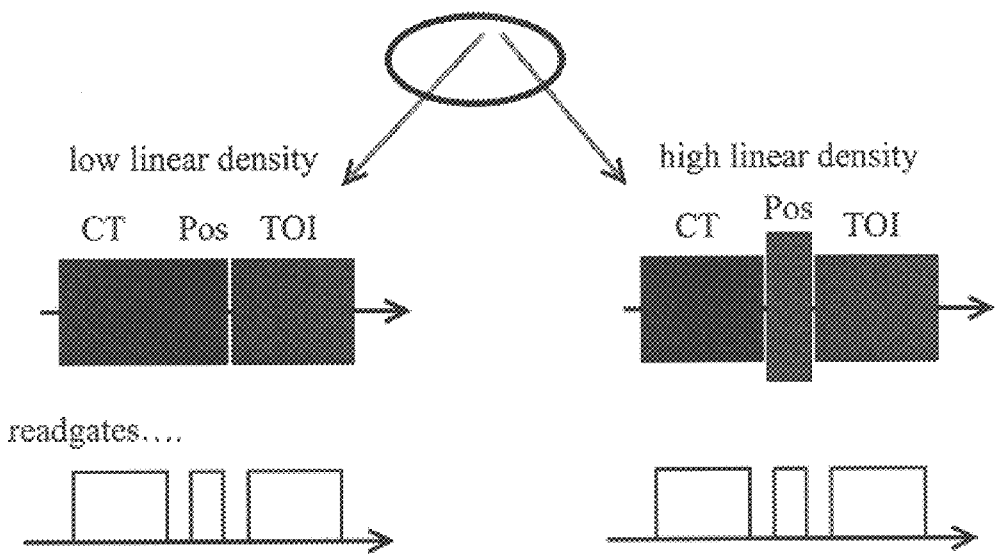
FIG. 5 shows a section of a single track containing a control-track section, a track of interest section and a positioning section.

In this example, a measurement was performed using a standard head with a written track width of about 1.23 µm, which is slightly larger (~30%) than the reader width. Instead of using pilot tones, a positioning section ("pos") was used to locate the position of the CT and TOI sections on the recorded track as shown in FIG. 5. In this case, the decay measurement was not performed over an entire track; instead, it was performed only in an arc ("measurement-arc"). The arc comprises the CT, the TOI and a positioning section in between them. The following steps were taken to carry out this example.

(1) A control-track (CT) was recorded according to the scheme explained above. The control track was a section of the measurement-arc discussed above. Using a track scan, the head could be re-positioned, whereby the track scan was performed with the read-gate set in the center of the measurement-arc. The track scan was repeated in short enough intervals (waiting time interval) such that no thermal drift occurred.

(2) The CT was aged.

(3) After aging, the TOI was recorded (4) Directly after recording, the CT and TOI signals were measured in the same way as discussed in Example 1 of the invention.

(5) After a waiting time interval, the track scan was repeated and the read head was re-positioned.

Figure 6:
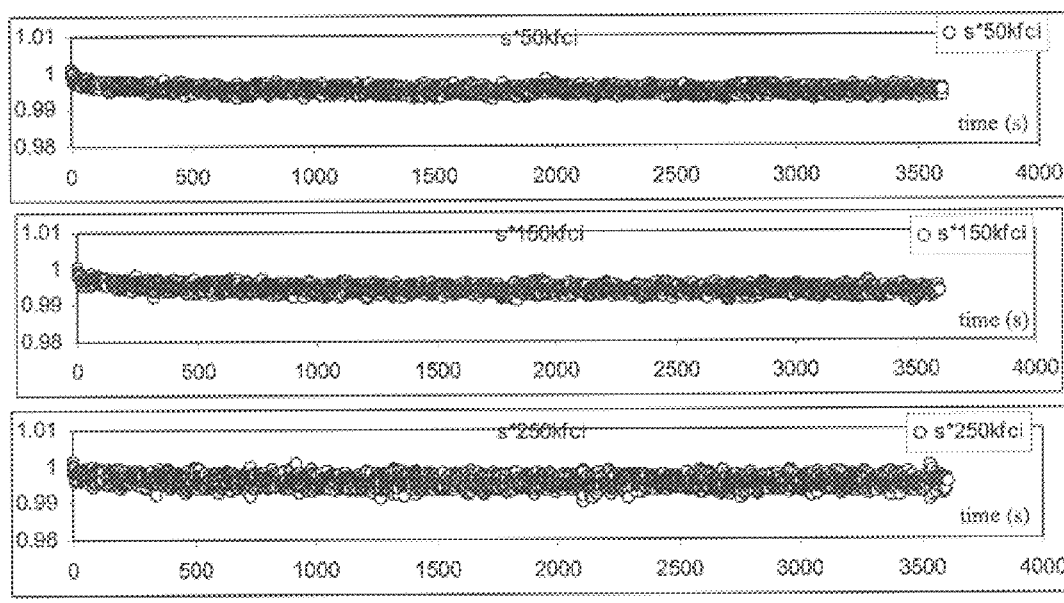
FIG. 6 shows the normalized traces of signals from a control track and a track of interest that were recorded at 50, 150 and 250 kfci.

FIG. 6 shows the normalized signal ratio S(TOI)/S(CT) from successful test runs using a head with a track width of ~1 µm.

In one variation of Example 2 this technique is a multiple linear density measurement. In this case, several measurement-arcs around the disk would be dedicated to individual linear densities. In this case, the CT's can be aged simultaneously, which saves time. Alternatively, one could also record the same density on each segment and investigate the circumferential homogeneity of the disk.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

What is claimed is:

1. A system for measuring signal decay, comprising means for positioning a recording head and a recording track comprising a control track section and a track of interest section located on one track of the recording track.

2. A method for measuring signal decay, comprising reading an information signal from a control track section, reading an information signal from a track of interest section, wherein the control track section and the track of interest section are located on one track of a recording track, and comparing said information signal from the control track section and said information from the track of interest section to determine said signal decay.

3. The method of claim 2, further comprising writing data onto the control track.

4. The method of claim 3, further comprising recording left and right pilot tones on each side of the control track.

5. The method of claim 4, further comprising locating a position where the left pilot tone reduces to 30% of a maximum value of the left pilot tone and locating a position where the right pilot tone increases to 30% of a maximum value of the right pilot tone.

6. The method of claim 3, further comprising aging the control track after said writing data to the control track.

7. The method of claim 6, further comprising monitoring the left and right pilot tones while aging the control track.

8. The method of claim 6, further comprising aligning a recording head with respect to the control track.

9. The method of claim 6, further comprising writing data onto the track of interest.

10. The method of claim 2, further comprising calculating a normalized signal S(TOI)/S(CT).

11. The method of claim 2, wherein said reading of an information signal from a control track and said reading of an information signal from a track of interest are done without swapping a recording head between two different recording tracks.

12. The method of claim 2, further comprising finding a track center using a track scan comprising a positioning section.

13. A system for measuring signal decay, comprising a control track section and a track of interest section located on one track of a recording track.

14. The system of claim 13, further comprising a read gate and a write gate.

15. The system of claim 13, further comprising means for generating pilot tones.

16. The system of claim 13, further comprising a device for computing a normalized signal S(TOI)/S(CT).

17. The system of claim 13, further comprising a recording head for reading an information signal from the recording track.

18. The system of claim 17, further comprising a spectrum analyzer for analyzing the information signal.

19. The system of claim 13, further comprising a read-write head comprising a writer and a reader, wherein a width of the writer is greater than a width of the reader.

* * * * *